(12) United States Patent
Shiomi et al.

(10) Patent No.: US 12,031,451 B2
(45) Date of Patent: Jul. 9, 2024

(54) JIG FOR VIBRATION TEST OF STATOR VANE

(71) Applicant: IHI CORPORATION, Tokyo (JP)

(72) Inventors: Kensuke Shiomi, Tokyo (JP); Kosuke Iwamoto, Tokyo (JP); Teruyoshi Otoyo, Tokyo (JP); Takashi Mori, Tokyo (JP); Takaomi Inada, Tokyo (JP)

(73) Assignee: HI CORPORATION, Tokyo (JP)

( * ) Notice: Subject to any disclaimer, the term of this patent is extended or adjusted under 35 U.S.C. 154(b) by 274 days.

(21) Appl. No.: 17/447,076

(22) Filed: Sep. 8, 2021

(65) Prior Publication Data

US 2021/0396155 A1 Dec. 23, 2021

Related U.S. Application Data

(63) Continuation of application No. PCT/JP2020/001940, filed on Jan. 21, 2020.

(30) Foreign Application Priority Data

Apr. 12, 2019 (JP) .................................. 2019-076437

(51) Int. Cl.
*G01M 7/04* (2006.01)
*F01D 25/28* (2006.01)
(Continued)

(52) U.S. Cl.
CPC ........... *F01D 25/285* (2013.01); *G01M 7/027* (2013.01); *G01M 7/04* (2013.01); *G01N 3/34* (2013.01);
(Continued)

(58) Field of Classification Search
CPC ........... G01M 7/04; G01M 7/027; G01N 3/32
See application file for complete search history.

(56) References Cited

U.S. PATENT DOCUMENTS

| 3,871,210 A | 3/1975 | Himmler et al. |
| 4,869,112 A * | 9/1989 | Gram ....................... G01N 3/08 73/796 |
| 2009/0199663 A1* | 8/2009 | Kaneda .................... G01N 3/08 73/866 |

FOREIGN PATENT DOCUMENTS

| CN | 104019950 A | 9/2014 |
| CN | 108801822 A | 11/2018 |
| (Continued) | | |

OTHER PUBLICATIONS

International Search Report dated Mar. 3, 2020 in PCT/JP2020/001940 filed on Jan. 21, 2020, 3 pages.

*Primary Examiner* — Daniel J Colilla
(74) *Attorney, Agent, or Firm* — Oblon, McClelland, Maier & Neustadt, L.L.P.

(57) ABSTRACT

Provided is a jig for a vibration test of a stator vane, for use in the vibration test for evaluating high cycle fatigue characteristics of the stator vane, and the jig is provided with a base plate that is fixed onto an excitation table of a shaker, a first fixed wall that is fixed onto the base plate in a state where a vane root end portion of a guide vane is fixed, a movable wall that is slidably placed on the base plate in a state where a vane tip portion of the guide vane is fixed, a second fixed wall that is fixed onto the base plate, and a hydraulic jack that is disposed between the movable wall and the second fixed wall, to apply a load in the span direction to the guide vane. Consequently, in the vibration test for evaluating the high cycle fatigue characteristics of the stator vane, the test simulating an actual operation state can be carried out, and an assumed deformed state can be exhibited in the stator vane to be subjected to the test.

4 Claims, 3 Drawing Sheets

(51) Int. Cl.
  *G01M 7/02*     (2006.01)
  *G01N 3/34*     (2006.01)
(52) U.S. Cl.
  CPC .... *F05D 2220/323* (2013.01); *F05D 2240/12* (2013.01); *F05D 2240/91* (2013.01)

(56) References Cited

FOREIGN PATENT DOCUMENTS

| | | | | |
|---|---|---|---|---|
| CN | 106248568 B | * | 12/2018 | ........... G01N 17/006 |
| DE | 102008050465 B4 | * | 12/2012 | ............. G01N 3/062 |
| JP | 48-059891 A | | 8/1973 | |
| JP | 04-164231 A | | 6/1992 | |
| JP | 2003-227774 A | | 8/2003 | |
| JP | 2012-149979 A | | 8/2012 | |
| JP | 5556678 B2 | | 7/2014 | |
| KR | 20100035903 A | * | 4/2010 | ............... G01N 3/02 |

* cited by examiner

JIG FOR VIBRATION TEST OF STATOR VANE

TECHNICAL FIELD

The present disclosure described herein relates to a jig for a vibration test, for use in performing the vibration test of an aircraft engine vane. Particularly, the present disclosure relates to a jig for a vibration test of a stator vane, suitable to perform the vibration test of the stator vane, such as a guide vane of an aircraft engine.

BACKGROUND ART

The above described vibration test of the aircraft engine vane is a test to be carried out for evaluating high cycle fatigue characteristics. In a background art, as a device for such a vibration test of the aircraft engine vane, for example, a fatigue testing device described in Patent Document 1 is known.

This fatigue testing device is a testing device to perform the vibration test of a rotor blade such as a fan blade in an aircraft engine. In the vibration test, so-called spot vibration is performed by colliding air with a blade surface of the rotor blade a blade root end portion of which is fixed.

On the other hand, as a vibration test of a stator vane such as a guide vane of the aircraft engine, for example, a vibration test is assumed in which opposite end portions of the stator vane are fixed to an excitation table of an electromagnetic shaker, to vibrate the stator vane in an out-of-plane direction.

RELATED ART DOCUMENT

Patent Document

Patent Document 1: Japanese Patent No. 5556678

SUMMARY OF THE DISCLOSURE

Problems to be Solved by the Disclosure

In an operation of a stator vane of an aircraft engine, a tensile load and a compressive load act on the vane due to pressure difference, temperature difference and gas force in the engine or a maneuver load generated by an aircraft maneuver state, and hence, the vane is deformed. If the stator vane is deformed in this manner, resonant frequency of the vane changes.

Here, in a case of carrying out a vibration test for evaluating high cycle fatigue characteristics of the stator vane of the aircraft engine by use of such an electromagnetic shaker as described above, continuous vibration is performed at the resonant frequency. Therefore, it is considered that the vibration test simulating an operation state can be realized by taking, into this vibration test, impact of the change in resonant frequency due to the above deformation during the operation.

Therefore, it is desired to construct a jig for the vibration test for carrying out such a vibration test simulating the operation state of the stator vane of the aircraft engine, and it has conventionally been attempted to solve the problem.

The present disclosure has been developed to solve such a conventional problem as described above, and an object of the present disclosure is to provide a jig for a vibration test of a stator vane, for use in performing the vibration test for evaluating high cycle fatigue characteristics of the stator vane, by which the test simulating an actual operation state can be carried out, and an assumed deformed state can be exhibited in the stator vane to be subjected to the test.

Means for Solving the Problems

A first aspect of the present disclosure is directed to a jig for a vibration test of a stator vane, for use in the vibration test for evaluating high cycle fatigue characteristics of the stator vane, and the jig is provided with a base plate that is fixed onto an excitation table of a shaker, a first fixed wall that is fixed onto the base plate in a state where first end portion of the stator vane in a span direction is fixed, a movable wall that is slidably placed on the base plate in a state where second end portion of the stator vane in the span direction is fixed, a second fixed wall that is fixed onto the base plate, and a force applying section that is disposed between the movable wall and the second fixed wall, to apply a load in the span direction to the stator vane.

When performing the vibration test for evaluating the high cycle fatigue characteristics of the stator vane of the aircraft engine by use of the jig for the vibration test of the stator vane of the present disclosure, first, the force applying section is connected to the stator vane fixed to the first fixed wall and movable wall of the base plate, so that the load can be applied.

Secondly, the base plate holding the stator vane is fixed onto the excitation table of the shaker. Subsequently, the force applying section applies, to the stator vane, the load equivalent to a load in the span direction during the operation.

Next, when the stator vane, the force applying section and the base plate on the excitation table are collectively excited by the shaker in a state where the above load is applied to the stator vane by the force applying section, the stator vane may be excited with the load simulating an actual operation state acting on the stator vane.

Effects of the Disclosure

According to the present disclosure, a jig for a vibration test of a stator vane brings excellent effects that the test simulating an actual operation state can be carried out and that an assumed deformed state can be exhibited in the stator vane to be subjected to the test, in a case of performing the vibration test for evaluating high cycle fatigue characteristics of the stator vane.

MODE FOR CARRYING OUT THE DISCLOSURE

Hereinafter, embodiments of the present disclosure will be described with reference to the drawings.

Figure 1A:
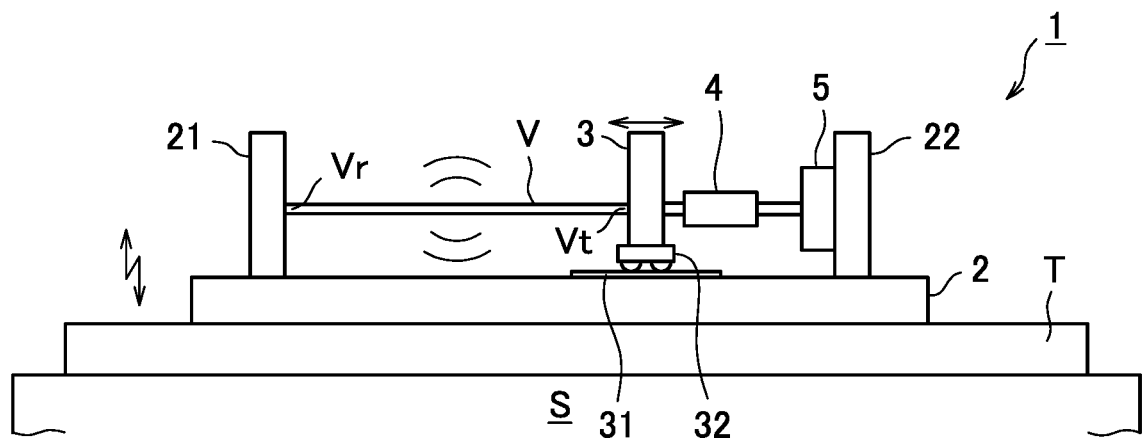
FIG. 1A is a front explanatory view showing a situation where a vibration test of a stator vane is performed by using a jig for the vibration test of the stator vane according to an embodiment of the present disclosure.
Figure 1B:
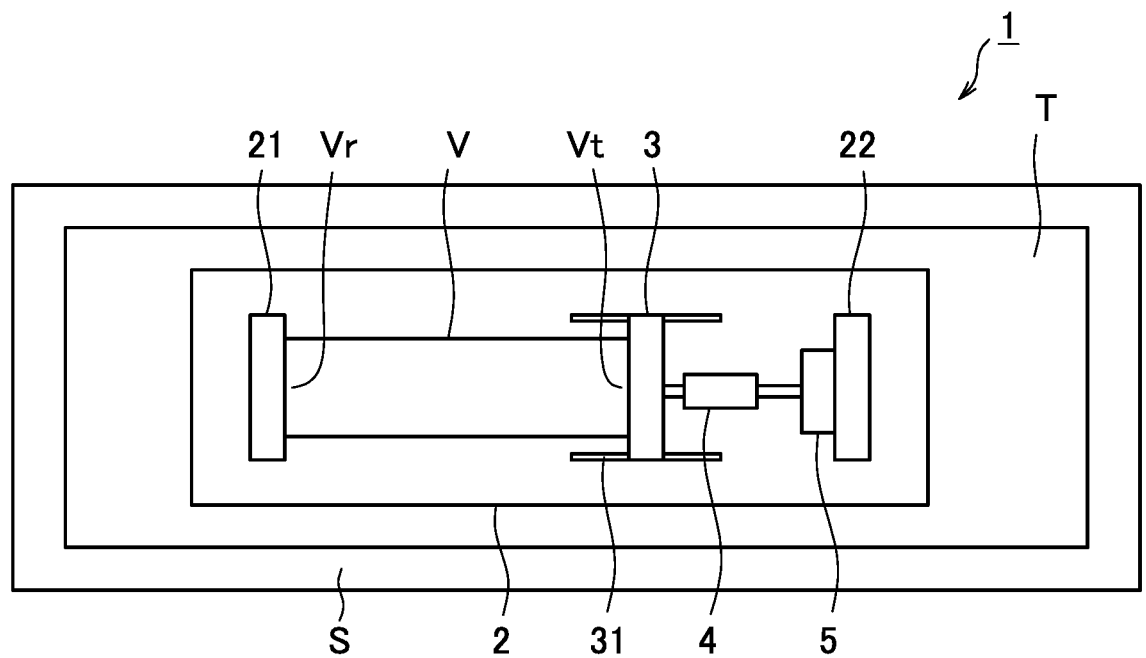
FIG. 1B is a planar explanatory view showing the situation where the vibration test of the stator vane is performed by using the jig for the vibration test of the stator vane according to the embodiment of the present disclosure.

FIGS. 1A, 1B show a jig for a vibration test of a stator vane according to an embodiment of the present disclosure. This embodiment illustrates a case where the jig for the vibration test of the stator vane according to the present disclosure is a jig for a vibration test, for use in the vibration test for evaluating high cycle fatigue characteristics of a guide vane (the stator vane) of an aircraft engine.

As shown in FIG. 1A, a jig 1 for the vibration test of the stator vane is provided with a base plate 2 that is fixed onto an excitation table T of an electromagnetic shaker S that vibrates in an up-down direction, a first fixed wall 21 that is fixed onto the base plate 2 in a state where a vane root end portion (first end portion in a span direction) Vr of a guide vane V is fixed, a movable wall 3 that is placed on the base plate 2 in a state where a vane tip portion (second end portion in the span direction) Vt of the guide vane V is fixed, and a second fixed wall 22 that is fixed onto the base plate 2.

In this embodiment, the excitation table T that vibrates in the up-down direction is used, and hence, the guide vane V is fixed to the first fixed wall 21 and the movable wall 3 in a state where a vane surface of the vane faces in the up-down direction.

The first fixed wall 21 is fixed to first end portion (a left end portion in the drawing) of the base plate 2. On the other hand, the second fixed wall 22 is fixed to second end portion (a right end portion in the drawing) of the base plate 2.

The movable wall 3 is located between the first fixed wall 21 and the second fixed wall 22. The first fixed wall 21, the movable wall 3 and the second fixed wall 22 are arranged side by side on the same line with each other almost without shifting right, left, up and down on the base plate 2 as shown also in FIG. 1B.

In this case, a rail 31 is placed on the base plate 2, and a wheel 32 is disposed in a lower end portion of the movable wall 3, so that the movable wall 3 is slidable in a direction of arrows shown in the drawing on the base plate 2.

Note that examples of means to make the movable wall 3 slidable on the base plate 2 include a linear guide and a long hole, besides the rail 31 and the wheel 32.

Furthermore, the jig 1 for the vibration test of the stator vane is provided with a hydraulic jack (a force applying section) 4 and a load cell (a load measuring section) 5. The hydraulic jack 4 and the load cell 5 are arranged on the same straight line with each other between the movable wall 3 and the second fixed wall 22.

Note that the force applying section includes tightening bolts besides the hydraulic jack 4. Furthermore, as the load measuring section, an axial force measurement bolt may be used besides the load cell 5.

That is, in this embodiment, the hydraulic jack 4 is operated to apply, to the guide vane V via the movable wall 3, a load equivalent to a load that acts in the span direction during an operation.

Then, in this embodiment, the base plate 2 to which the guide vane V is fixed as described above is mounted to the excitation table T of the electromagnetic shaker S that vibrates in the up-down direction, to perform the vibration test for evaluating the high cycle fatigue characteristics of the stator vane of the aircraft engine.

Note that the base plate 2 is mounted to the excitation table T by use of bolts provided on the table, or the like, and any special fixtures are not needed.

When performing the vibration test for evaluating the high cycle fatigue characteristics of the stator vane by use of the jig 1 for the vibration test of the stator vane according to this embodiment, first, the vane root end portion Vr of the guide vane V is fixed to the first fixed wall 21 on the base plate 2, and the vane tip portion Vt of the guide vane V is fixed to the movable wall 3.

Secondly, the hydraulic jack 4 is connected to both the movable wall 3 and the second fixed wall 22, so that the load can be applied to the movable wall 3.

Next, the base plate 2 holding the guide vane V is fixed onto the excitation table T of the electromagnetic shaker S. Subsequently, the hydraulic jack 4 is operated to apply, to the guide vane V via the movable wall 3, the load equivalent to the load that acts in the span direction during the operation.

Then, when the guide vane V, the hydraulic jack 4 and the base plate 2 on the excitation table T are collectively excited in the up-down direction by the electromagnetic shaker S in a state where the above load is applied to the guide vane V, the guide vane V may be excited with the load simulating an actual operation state acting on the guide vane.

In the jig 1 for the vibration test of the stator vane according to this embodiment, the test simulating the actual operation state can be carried out, and an assumed deformed state can be exhibited in the guide vane V subjected to the test.

Furthermore, in the jig 1 for the vibration test of the stator vane according to this embodiment, in addition to the first fixed wall 21, the second fixed wall 22 and the movable wall 3, the hydraulic jack 4 serving as the force applying section is also disposed on the base plate 2, and hence, the base plate 2 serves as an internal force system for the load to be applied to the guide vane V. As a result, damages on the electromagnetic shaker S and deformation of the excitation table T can be avoided.

Furthermore, the jig 1 for the vibration test of the stator vane according to this embodiment is provided with the load cell 5 that measures the load to be applied from the hydraulic jack 4 to the guide vane V, and hence, it can be confirmed that the load simulating the actual operation state is applied to the guide vane V.

In this embodiment, the excitation table T that vibrates in the up-down direction is used, and hence, the guide vane V is fixed to the first fixed wall 21 and the movable wall 3 in the state where the vane surface of the vane faces in the up-down direction. Note that in a case of using the excitation table T that vibrates in a horizontal direction, the test can be similarly performed by fixing the guide vane V so that the vane surface of the guide vane V faces in a vibration direction of the excitation table T.

Figure 2:
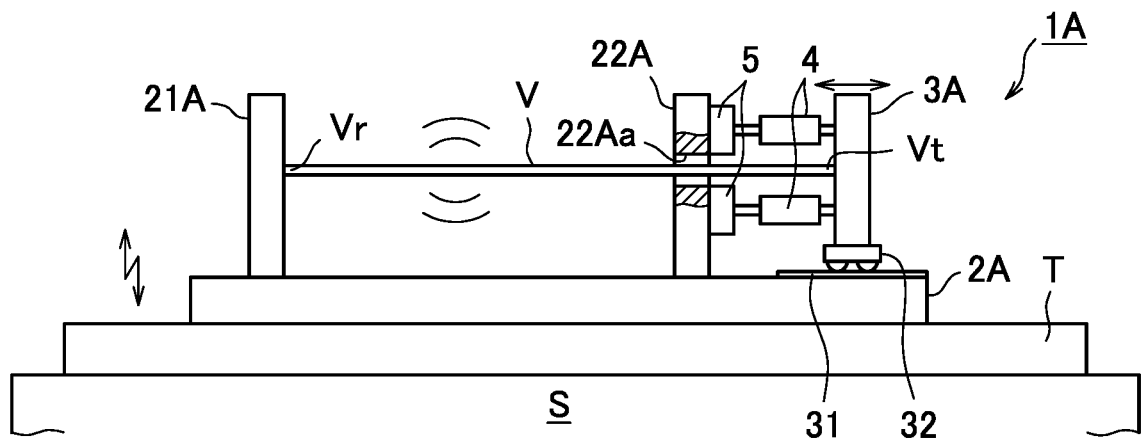
FIG. 2 is a front explanatory view showing a situation where the vibration test of the stator vane is performed by using a jig for the vibration test of the stator vane according to another embodiment of the present disclosure.

FIG. 2 shows a jig for a vibration test of a stator vane according to another embodiment of the present disclosure. This embodiment also illustrates a case where the jig for the vibration test of the stator vane according to the present disclosure is a jig for a vibration test, for use in the vibration test for evaluating high cycle fatigue characteristics of a guide vane (the stator vane) of an aircraft engine.

As shown in FIG. 2, a jig 1A for the vibration test of the stator vane is different from the jig 1 for the vibration test according to the previous embodiment shown in FIGS. 1A, 1B, in that a movable wall 3A slidable on a base plate 2A is disposed in second end portion (a right end portion in the drawing) of the base plate 2A, in that an opening 22Aa through which a guide vane V extends is formed in a second fixed wall 22A, and in that the second fixed wall 22A is disposed between a first fixed wall 21A and the movable wall 3A. This jig is the same as the jig 1 for the vibration test according to the previous embodiment, in that a hydraulic jack 4 and a load cell 5 are arranged between the movable wall 3A and the second fixed wall 22A.

When performing the vibration test for evaluating the high cycle fatigue characteristics of the stator vane by use of the jig 1A for the vibration test of the stator vane according to this embodiment, first, the guide vane V is passed through the opening 22Aa in the second fixed wall 22A of the base plate 2A, a vane root end portion Vr of the guide vane V is then fixed to the first fixed wall 21A, and a vane tip portion Vt of the guide vane V is fixed to the movable wall 3A.

Secondly, the hydraulic jack 4 is connected to both the movable wall 3A and the second fixed wall 22A, so that a load can be applied to the movable wall 3A.

Next, the base plate 2A holding the guide vane V is fixed onto an excitation table T of an electromagnetic shaker S. Subsequently, the hydraulic jack 4 is operated to apply, to the guide vane V via the movable wall 3A, the load equivalent to a load that acts in a span direction during an operation.

Then, when the guide vane V, the hydraulic jack 4 and the base plate 2A on the excitation table T are collectively excited in an up-down direction by the electromagnetic shaker S in a state where the above load is applied to the guide vane V, the guide vane V may be excited with the load simulating an actual operation state acting on the guide vane.

Also, in the jig 1A for the vibration test of the stator vane according to this embodiment, the test simulating the actual operation state can be carried out, and an assumed deformed state can be exhibited in the guide vane V subjected to the test.

Also, in the jig 1A for the vibration test of the stator vane according to this embodiment, in addition to the first fixed wall 21A, the second fixed wall 22A and the movable wall 3A, the hydraulic jack 4 serving as a force applying section is also disposed on the base plate 2A, and hence, the base plate 2A serves as an internal force system for the load to be applied to the guide vane V. As a result, damages on the electromagnetic shaker S and deformation of the excitation table T can be avoided.

Further, the jig 1A for the vibration test of the stator vane according to this embodiment is provided with the load cell 5 that measures the load to be applied from the hydraulic jack 4 to the guide vane V, and hence, it can be confirmed that the load simulating the actual operation state is applied to the guide vane V.

Furthermore, in the jig 1A for the vibration test of the stator vane according to this embodiment, the movable wall 3A is disposed in second end portion of the base plate 2A, and additionally, the second fixed wall 22A is disposed between the first fixed wall 21A and the movable wall 3A. Therefore, the jig may be also suitably used for a vibration test of a longer-span stator vane, as compared to the jig 1 for the vibration test according to the previous embodiment.

Figure 3:
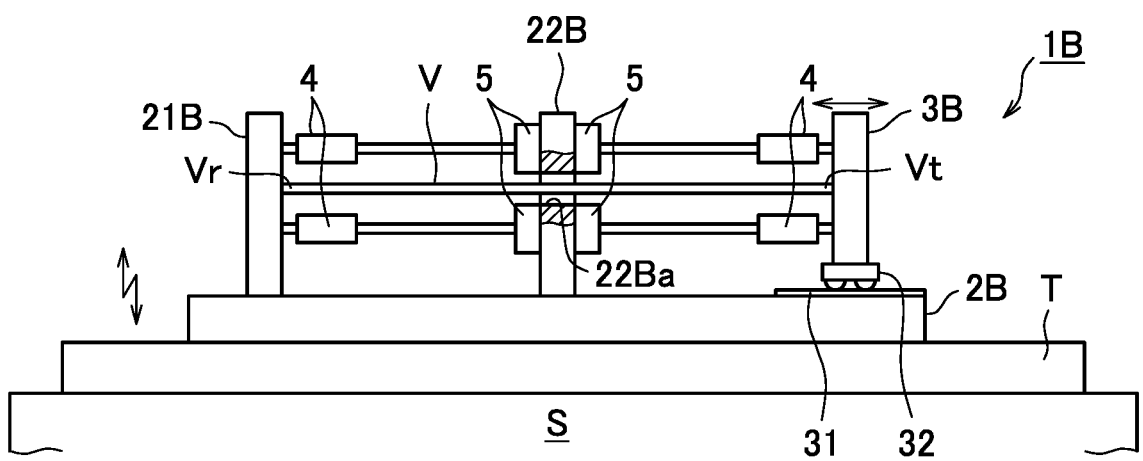
FIG. 3 is a front explanatory view showing a situation where the vibration test of the stator vane is performed by using a jig for the vibration test of the stator vane according to still another embodiment of the present disclosure.

FIG. 3 shows a jig for a vibration test of a stator vane according to still another embodiment of the present disclosure. This embodiment also illustrates a case where the jig for the vibration test of the stator vane according to the present disclosure is for use in the vibration test for evaluating high cycle fatigue characteristics of a guide vane (the stator vane) of an aircraft engine.

As shown in FIG. 3, a jig 1B for the vibration test of the stator vane is different from the jig 1A for the vibration test according to the previous embodiment shown in FIG. 2, in that a hydraulic jack 4 and a load cell 5 are also arranged between a first fixed wall 21B and a second fixed wall 22B including an opening 22Ba through which a guide vane V extends. The other configuration is the same as that in the jig 1A for the vibration test according to the previous embodiment.

When performing the vibration test for evaluating the high cycle fatigue characteristics of the stator vane by use of the jig 1B for the vibration test of the stator vane according to this embodiment, a vane root end portion Vr of the guide vane V passed through the opening 22Ba of the second fixed wall 22B is fixed to the first fixed wall 21B, and a vane tip portion Vt of the guide vane V is fixed to a movable wall 3B.

Afterward, the hydraulic jack 4 is connected to both the movable wall 3B and the second fixed wall 22B, so that a load can be applied to the movable wall 3B. Additionally, the hydraulic jack 4 is also connected between the first fixed wall 21B and the second fixed wall 22B.

Next, a base plate 2B holding the guide vane V is fixed onto an excitation table T of an electromagnetic shaker S. Subsequently, respective hydraulic jacks 4 on opposite sides of the second fixed wall 22B are operated by the same amount to apply the load also to the second fixed wall 22B, while applying, to the guide vane V via the movable wall 3B, a load equivalent to a load that acts in a span direction during the operation.

Then, when the guide vane V, the hydraulic jack 4 and the base plate 2B on the excitation table T are collectively excited in an up-down direction by the electromagnetic shaker S in a state where the above load is applied to the guide vane V, the guide vane V may be excited with the load simulating an actual operation state acting on the guide vane.

Also, in the jig 1B for the vibration test of the stator vane according to this embodiment, the test simulating the actual operation state can be carried out, and an assumed deformed state can be exhibited in the guide vane V subjected to the test. Additionally, the first fixed wall 21B, the second fixed wall 22B, the movable wall 3B and the hydraulic jack 4 are arranged on the base plate 2B, and hence, the base plate 2B serves as an internal force system for the load to be applied to the guide vane V. As a result, damages on the electromagnetic shaker S and deformation of the excitation table T can be avoided.

Also, in the jig 1B for the vibration test of the stator vane according to this embodiment, it can be confirmed that the load simulating the actual operation state is applied to the guide vane V, and additionally, the jig may be also suitably used for a vibration test of a longer-span stator vane in the same manner as in the jig 1A for the vibration test according to the previous embodiment.

Further, in the jig 1B for the vibration test of the stator vane according to this embodiment, when applying, to the guide vane V via the movable wall 3B, the load equivalent to the load that acts in the span direction during the operation, a load similar to the above load is also applied to the second fixed wall 22B, and hence, a force that acts on the second fixed wall 22B is offset. As a result, the second fixed wall 22B on the base plate 2B can be easily designed.

Figure 4:
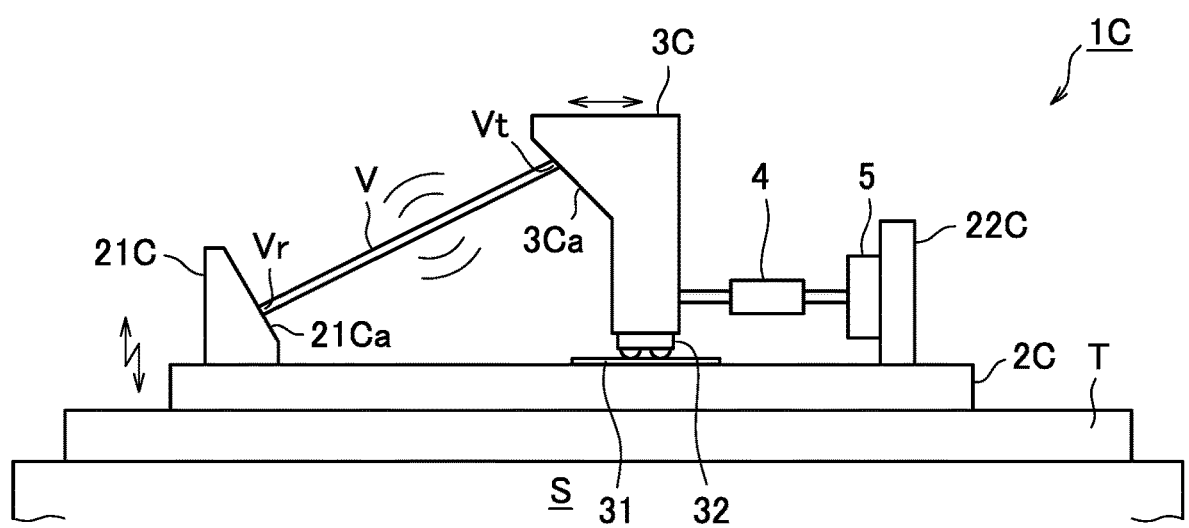
FIG. 4 is a front explanatory view showing a situation where the vibration test of the stator vane is performed by using a jig for the vibration test of the stator vane according to a further embodiment of the present disclosure.

FIG. 4 shows a jig for a vibration test of a stator vane according to a further embodiment of the present disclosure. This embodiment also illustrates a case where the jig for the vibration test of the stator vane according to the present disclosure is for use in the vibration test for evaluating high cycle fatigue characteristics of a guide vane (the stator vane) of an aircraft engine.

As shown in FIG. 4, a jig 1C for the vibration test of the stator vane is different from the jig 1 for the vibration test according to the previous embodiment shown in FIG. 1, in that fixed inclined surfaces 21Ca, 3Ca facing each other are formed on both a first fixed wall 21C and a movable wall 3C to which a guide vane V is fixed, respectively. The other configuration is the same as that in the jig 1 for the vibration test according to the previous embodiment.

When performing the vibration test for evaluating the high cycle fatigue characteristics of the stator vane by use of the jig 1C for the vibration test of the stator vane according to this embodiment, first, a vane root end portion Vr of the guide vane V is fixed to the fixed inclined surface 21Ca in the first fixed wall 21C of a base plate 2C, and a vane tip portion Vt of the guide vane V is fixed to the fixed inclined surface 3Ca of the movable wall 3C.

At this time, since the respective fixed inclined surfaces 21Ca, 3Ca of the first fixed wall 21C and the movable wall 3C face each other, the guide vane V is fixed at an angle to the base plate 2C between the first fixed wall 21C and the movable wall 3C.

Secondly, a hydraulic jack 4 is connected to both the movable wall 3C and a second fixed wall 22C, so that a load can be applied to the movable wall 3C.

Next, the base plate 2C holding the guide vane V is fixed onto an excitation table T of an electromagnetic shaker S. Subsequently, the hydraulic jack 4 is operated to apply, to the guide vane V via the movable wall 3C, the load equivalent to a load that acts in a span direction during the operation.

Then, when the guide vane V, the hydraulic jack 4 and the base plate 2C on the excitation table T are collectively excited in an up-down direction by the electromagnetic shaker S in a state where the above load is applied to the guide vane V, the guide vane V may be excited with the load simulating an actual operation state acting on the guide vane.

In the jig 1C for the vibration test of the stator vane according to this embodiment, the test simulating the actual operation state can be carried out, and an assumed deformed state can be exhibited in the guide vane V subjected to the test.

Additionally, since the load equivalent to the load that acts in the span direction during the operation is applied to the guide vane V fixed at the angle to the base plate 2C, the angle of the guide vane V to the base plate 2C is adjusted. Consequently, a stress state that varies in accordance with a position of the vane to be mounted in the aircraft engine can be reproduced.

Also, in the jig 1C for the vibration test of the stator vane according to this embodiment, the first fixed wall 21C, the second fixed wall 22C, the movable wall 3C and the hydraulic jack 4 are arranged on the base plate 2C, and hence, the base plate 2C serves as an internal force system for the load to be applied to the guide vane V. As a result, damages on the electromagnetic shaker S and deformation of the excitation table T can be avoided.

Furthermore, the jig 1C for the vibration test of the stator vane according to this embodiment is also provided with a load cell 5 that measures the load to be applied from the hydraulic jack 4 to the guide vane V, and hence, it can be confirmed that the load simulating the actual operation state is applied to the guide vane V.

The configuration of the jig for the vibration test of the stator vane according to the present disclosure is not limited to the above described embodiments, and can be variously modified without departing from scope of the disclosure.

The first aspect of the present disclosure is a jig for a vibration test of a stator vane, for use in the vibration test for evaluating high cycle fatigue characteristics of the stator vane, and the jig is provided with a base plate that is fixed onto an excitation table of a shaker, a first fixed wall that is fixed onto the base plate in a state where first end portion of the stator vane in a span direction is fixed, a movable wall that is slidably placed on the base plate in a state where second end portion of the stator vane in the span direction is fixed, a second fixed wall that is fixed onto the base plate, and a force applying section that is disposed between the movable wall and the second fixed wall, to apply a load in the span direction to the stator vane.

When performing the vibration test for evaluating the high cycle fatigue characteristics of the stator vane of the aircraft engine by use of the jig for the vibration test of the stator vane according to the first aspect of the present disclosure, first, the force applying section is connected to the stator vane fixed to the first fixed wall and the movable wall of the base plate, so that the load can be applied.

Secondly, the base plate holding the stator vane is fixed onto the excitation table of the shaker. Subsequently, the force applying section applies, to the stator vane, the load equivalent to a load in the span direction during the operation.

Next, when the stator vane, the force applying section and the base plate on the excitation table are collectively excited by the shaker in a state where the above load is applied to the stator vane by the force applying section, the stator vane may be excited with the load simulating an actual operation state acting on the stator vane.

Furthermore, a second aspect of the present disclosure is provided with a load measuring section that measures the load to be applied from the force applying section to the stator vane.

The jig for the vibration test of the stator vane according to the second aspect of the present disclosure is provided with the load measuring section that measures the load to be applied from the force applying section to the stator vane, and hence, it can be confirmed that the load simulating the actual operation state is applied to the stator vane.

EXPLANATION OF REFERENCE SIGNS 1, 1A to 1C jig for vibration test of stator vane
2, 2A to 2C base plate
3, 3A to 3C movable wall
4 hydraulic jack (force applying section)
5 load cell (load measuring section)
21, 21A to 21C first fixed wall
22, 22A to 22C second fixed wall
V guide vane (stator vane)
Vr vane root end portion (first end portion of stator vane in span direction)
Vt vane tip portion (second end portion of stator vane in span direction)
S shaker
T excitation table

The invention claimed is:

1. A jig configured for a vibration test of a stator vane, configured for use in the vibration test for evaluating high cycle fatigue characteristics of the stator vane, the jig comprising:
  a base plate that is configured to be fixed onto an excitation table of a shaker, a first fixed wall that is fixed onto the base plate, wherein the first fixed wall is configured to fix a first end portion of the stator vane in a span direction of the stator vane, a movable wall that is slidably placed on the base plate, wherein the movable wall is configured to fix a second end portion of the stator vane in the span direction of the stator vane, a second fixed wall that includes an opening through which the stator vane extends and is fixed between the first fixed wall and the movable wall on the base plate, wherein the second fixed wall is configured to receive the stator vane through the opening, and a force applying section that is disposed between the movable wall and the second fixed wall, and is configured to apply a load in the span direction to the stator vane.

2. The jig for the vibration test of the stator vane according to claim 1, further comprising:

a load measuring section that measures the load applied from the force applying section to the stator vane.

3. A jig configured for a vibration test of a stator vane, configured for use in the vibration test for evaluating high cycle fatigue characteristics of the stator vane, the jig comprising:

a base plate that is configured to be fixed onto an excitation table of a shaker, a first fixed wall that is fixed onto the base plate, wherein the first fixed wall is configured to fix a first end portion of the stator vane in a span direction of the stator vanes, a movable wall that is slidably placed on the base plate, wherein the movable wall is configured to fix a second end portion of the stator vane in the span direction of the stator vane, a second fixed wall that is fixed onto the base plate, and a force applying section that is disposed between the movable wall and the second fixed wall, and is configured to apply a load in the span direction to the stator vane, wherein a first fixed inclined surface is formed on the first fixed wall and a second fixed inclined surface is formed on the movable wall, wherein the first fixed inclined surface and the second fixed inclined surface are facing each other.

4. The jig for the vibration test of the stator vane according to claim 3, further comprising:

a load measuring section that measures the load applied from the force applying section to the stator vane.

* * * * *